United States Patent
Wittwer et al.

(10) Patent No.: US 12,312,513 B2
(45) Date of Patent: May 27, 2025

(54) TWO COMPONENT POLYURETHANE SYSTEM FOR LIQUID APPLIED SOUND DEADENER

(71) Applicant: H.B. Fuller Company, St. Paul, MN (US)

(72) Inventors: Wolfgang Wittwer, Pirmasens (DE); Timo Backes, Schmelz (DE)

(73) Assignee: H.B. Fuller Company, St. Paul, MN (US)

( * ) Notice: Subject to any disclaimer, the term of this patent is extended or adjusted under 35 U.S.C. 154(b) by 831 days.

(21) Appl. No.: 17/289,450

(22) PCT Filed: Oct. 31, 2019

(86) PCT No.: PCT/US2019/059208
§ 371 (c)(1),
(2) Date: Apr. 28, 2021

(87) PCT Pub. No.: WO2020/092800
PCT Pub. Date: May 7, 2020

(65) Prior Publication Data
US 2022/0186069 A1    Jun. 16, 2022

Related U.S. Application Data

(60) Provisional application No. 62/684,968, filed on Jun. 14, 2019.

(51) Int. Cl.
*H05K 5/00* (2025.01)
*A47L 15/42* (2006.01)
(Continued)

(52) U.S. Cl.
CPC ............. *C09J 7/35* (2018.01); *A47L 15/4251* (2013.01); *B05D 3/007* (2013.01); *C08G 18/242* (2013.01);
(Continued)

(58) Field of Classification Search
CPC ...................................................... H05K 5/00
See application file for complete search history.

(56) References Cited

U.S. PATENT DOCUMENTS 5,064,873 A * 11/1991 Snider .................... C08G 18/10
                                                        521/902
6,193,887 B1 * 2/2001 Giorgini ................. C08G 18/10
                                                        156/305
(Continued)

FOREIGN PATENT DOCUMENTS

DE    2735153       2/1979
WO    WO2006050961  5/2006

OTHER PUBLICATIONS

Sika, "SikaFloor® Marine PU-Red, Base", Safety Data Sheet, Dec. 22, 2008. Italy.
(Continued)

*Primary Examiner* — Kelly M Gambetta
*Assistant Examiner* — Mohammad Mayy
(74) *Attorney, Agent, or Firm* — Daniel J. Barta

(57) ABSTRACT

A method for producing a coating on a surface of a component part or a device, the method comprises obtaining a two component polyurethane system having a Component A and a Component B, Component A comprises a polyol and Component B comprises an isocyanate. Either Component A or Component B or both components comprise a filler. The method includes mixing Components A and B, to form a mixture comprising the polyol, the isocyanate, and the filler. The method includes applying the mixture to a surface of a component part or a device to form a coating from the mixture; and allowing the applied coating to cure. The steps of applying the coating and allowing the applied coating to cure are performed at an ambient temperature, and the
(Continued)

viscosity of the mixture immediately after the mixing step is from 10 Pas to 500 Pas at 23° C.

16 Claims, 3 Drawing Sheets

(51) Int. Cl.
| | |
|---|---|
| B05D 3/00 | (2006.01) |
| C08G 18/24 | (2006.01) |
| C08G 18/36 | (2006.01) |
| C08G 18/48 | (2006.01) |
| C08G 18/66 | (2006.01) |
| C08G 18/76 | (2006.01) |
| C08K 3/26 | (2006.01) |
| C08K 3/30 | (2006.01) |
| C08K 3/32 | (2006.01) |
| C08K 5/01 | (2006.01) |
| C08K 5/3435 | (2006.01) |
| C08K 5/5357 | (2006.01) |
| C08K 9/04 | (2006.01) |
| C08L 23/12 | (2006.01) |
| C08L 23/16 | (2006.01) |
| C08L 23/26 | (2006.01) |
| C08L 51/06 | (2006.01) |
| C08L 91/06 | (2006.01) |
| C09D 175/08 | (2006.01) |
| C09J 7/35 | (2018.01) |
| D06F 37/20 | (2006.01) |
| D06F 49/06 | (2006.01) |

(52) U.S. Cl.
CPC ......... *C08G 18/36* (2013.01); *C08G 18/4845* (2013.01); *C08G 18/6696* (2013.01); *C08G 18/7671* (2013.01); *C08K 3/26* (2013.01); *C08K 3/30* (2013.01); *C08K 3/32* (2013.01); *C08K 5/01* (2013.01); *C08K 5/3435* (2013.01); *C08K 5/5357* (2013.01); *C08K 9/04* (2013.01); *C08L 23/12* (2013.01); *C08L 23/16* (2013.01); *C08L 23/26* (2013.01); *C08L 51/06* (2013.01); *C08L 91/06* (2013.01); *C09D 175/08* (2013.01); *D06F 37/20* (2013.01); *D06F 49/06* (2013.01); *C08K 2003/265* (2013.01); *C08K 2003/3045* (2013.01); *C08K 2003/323* (2013.01); *C08L 2201/02* (2013.01); *C08L 2201/08* (2013.01); *C08L 2205/02* (2013.01); *C08L 2205/035* (2013.01); *C08L 2314/06* (2013.01); *C09J 2301/304* (2020.08); *C09J 2301/312* (2020.08); *C09J 2301/408* (2020.08); *C09J 2301/414* (2020.08); *C09J 2423/10* (2013.01); *C09J 2423/16* (2013.01)

(56) References Cited

U.S. PATENT DOCUMENTS

| | | | |
|---|---|---|---|
| 6,617,031 B1* | 9/2003 | Glasbrenner | C09J 175/06 528/80 |
| 2006/0182978 A1* | 8/2006 | Leroy | C08G 18/12 428/423.1 |
| 2009/0035506 A1* | 2/2009 | Pind | C09J 175/04 156/331.7 |
| 2011/0168217 A1 | 7/2011 | Neff et al. | |
| 2011/0305865 A1* | 12/2011 | Cocconi | B60R 13/0815 427/244 |
| 2012/0161353 A1 | 6/2012 | Hannig et al. | |
| 2014/0242322 A1* | 8/2014 | Giorgini | H05K 5/06 428/76 |

OTHER PUBLICATIONS

Sika, "SikaFloor® Marine PU-Red, Hardener", Safety Data Sheet, May 16, 2009. Italy.
Sika, SikaFloor® Marine PU-Red, Technical Data Sheet, Version 9.05 (2005). Denmark.
Testimony of Marcel Ras, Head of Technology, Sika Nederland B.V. Dec. 13, 2024. Netherlands.
Testimony of Marko Vidovic, R&D Project Manager, Sika Automotive Deutschland GmbH Dec. 13, 2024. Germany.

* cited by examiner

TWO COMPONENT POLYURETHANE SYSTEM FOR LIQUID APPLIED SOUND DEADENER

TECHNICAL FIELD

The present invention pertains to a two component polyurethane system, its application and its use. More particularly, disclosed herein is a two component polyurethane that can be applied using an extrusion apparatus. A coating made of said two component polyurethane system is particularly useful for dampening vibration, for example, of household appliances or vehicle parts, such as the vibration of a dryer or a dishwasher. The two component polyurethane system disclosed herein is useful as a liquid applied sound deadener (LASD).

BACKGROUND

In the manufacture of vehicles, machines and appliances, nowadays thin-walled sheets are commonly used. As a result of mechanically moved parts or running motors, these sheets often vibrate and therefore radiate sound. For example, noise and vibration are generated by the engine and the wheels during the driving of a car. This creates noise in the vehicle passenger cabin via the vibration of the automotive body. The resulting noise is unwanted, and effective measures to dampen or reduce this sound by dampening the vibration are desirable.

The same applies to household appliances and parts thereof, for example a dryer or a dryer drum, or devices and parts thereof made from certain materials, for example parts made from plastic or metal. For example, parts of a dishwasher are often partially or completely made from plastic, e.g. the tub, the housing and the washing chamber. Some of these parts require damping of vibrations to reduce the noise produced when in operation.

A common solution to the problem of sound created by vibration used in the industry is sound deadeners that dampen the sound caused by vibration of devices and device parts. Known for this purpose are pads made from bitumen, sometimes associated with absorption felts. Bitumen pads are used to dampen noise and vibration, while felts are mainly used for noise absorption. Bitumen is currently considered the most suitable sound deadener material for dishwashers because it has a semi-fluid behavior, especially at high temperature, and therefore has a viscous response which makes it suitable for damping purposes. However, bitumen may emit volatile organic compounds because there are polycyclic aromatic hydrocarbons and sulphur compounds present in the material, which is an environmental risk especially in case of heat exposure. Bitumen may also lack damping performance at room temperature and more generally at low temperature.

Moreover, bitumen is commonly applied as a foil or pad which severely restricts its applicability to substrates with complex surfaces and adds to the length and complexity of the production line for making work-pieces. For example, the pads often have to be cut and fitted by hand. Attaching the pads is also difficult to apply overhead and on slanted, vertical or curved surfaces. A method to apply bitumen by spraying instead of as a pad is described in DE 39 32 033 A1. However, this spraying process requires application temperatures of between 165° C. and 195° C., which means that the bitumen mass must be melted before use or must be transported to its use in heated containers.

Some sound deadeners are applied in liquid form. Such sound deadeners are called liquid applied sound deadener (LASD), and are generally used as a coating on surfaces, or as fillers for gaps. The LASD, once applied and cured, converts body-borne noise into thermal energy, it absorbs sound better than the uncoated substrate due to the higher mass of the resulting work-piece, and it dampens the vibration of the work-piece. Such LASD therefore reduce the noise made by a vibrating work-piece. LASDs are nowadays often preferred to bitumen pads, because they can be applied by spraying them onto a work piece, they can be applied by a robotic system (which helps avoid exposing a human operator to potentially harmful fumes), they are light-weight when compared to bitumen pads (thus saving fuel in cars and trucks, for example), and they are tunable to specific sound-deadening requirements.

The most common LASDs are currently acrylic-based LASD, rubber-based LASD, and thermoset LASD, for example the LASDs offered under the trade name TEROSON® (from Henkel Adhesives, of Düsseldorf, Germany). However, the rubber based and thermoset LASDs have to be applied at elevated temperatures (35 to 45° C.), and they have to be cured in an oven at elevated temperatures. The acrylic-based LASD also has to be cured in an oven at elevated temperatures.

Some LASDs are usually applied as a spray, which may have certain disadvantages. Overspray may occur; spraying might cause dripping and running on overhead and slanted surfaces; and sagging may occur.

For example, WO 99/55783 describes a spray made of a two component polyurethane which is used as a sound deadener. Said spray requires a very low viscosity to achieve sprayability. Its polyol part has a viscosity of 6 to 8 Pas, and its isocyanate part of 1 Pas.

EP 2 626 854 B1 describes a sound deadening coating made by spraying a polyurethane on a dishwasher surface. However, EP 2 626 854 B1 does not teach a workable composition or properties for such a polyurethane system.

Polyurethane foams may possibly be used as sound deadener. However, foams have the disadvantage that automated application of the liquid components is difficult because the resulting foaming grade must be reached and may be difficult to attain in instances where there is limited assembly space.

There is a need for a liquid applied sound deadener (LASD) which does not have the disadvantages of a conventional LASD, especially of a spray-applied sound deadener. There is also a need for an LASD which is suitable for sound deadening purposes, and which should be suitable for application on slanted surfaces and at ambient temperatures. Furthermore, there is a need for an LASD which does not require additional heat, e.g. curing in an oven, and that can be easily incorporated in an automated production line.

SUMMARY

Disclosed herein is a two component polyurethane system. The two components of said system are mixed and then applied to a substrate which is part of a device or of a component part. The resulting coating dampens vibration and the resulting sound emission.

Particularly, the present disclosure provides an LASD which is a two component reactive polyurethane system comprising a Component A and a Component B, wherein Component A comprises a polyol and Component B comprises an isocyanate that may be based on MDI. Either Component A or Component B or both components comprise a filler. Optionally, a polymerization catalyst for the polyurethane system may also be present in or added to Components A and/or B, or the mixture of both.

Disclosed herein is a method for producing a coating on a surface of a component part or a device. The method comprises obtaining a two component polyurethane system comprising a Component A and a Component B. Component A comprises a polyol and Component B comprises an isocyanate. Either Component A or Component B or both components comprise a filler. The method includes mixing Components A and B, to form a mixture comprising the polyol, the isocyanate, and the filler. The method includes applying the mixture to a surface of a component part or a device to form a coating from the mixture; and allowing the applied coating to cure. The steps of applying the coating and allowing the applied coating to cure are performed at an ambient temperature from 10° C. to 40° C., and the viscosity of the mixture immediately after the mixing step is from 10 Pas to 500 Pas at 23° C. when measured with a Brookfield RV viscometer at 10 rpm using an RV-7 spindle.

In some aspects, the density of the mixture of Components A and B is from 0.7 to 3 g/cm3 at 23° C. In some aspects, the ratio of the isocyanate groups to the polyol hydroxyl groups in the mixture is from 0.55 to 1.2, preferably from 0.6 to 1.1, more preferably from 0.6 to 1.0. In some aspects, Component A has a viscosity from 20 to 1000 Pas at 23° C. and Component B has a viscosity in the range from 0.01 to 10 Pas at 23° C. when measured with a Brookfield RV viscometer. In some aspects, the polyurethane coating is applied by extrusion to form at least one of a film or bead.

In some aspects, the polyurethane coating is applied by a dispenser onto a surface which is vertical, slanted, curved, or overhead in relation to the dispenser. In some aspects, the polyurethane coating is a sound deadening coating and wherein the maximum loss factor at 2nd order (100-150 Hz) is 0.1 or greater when measured at a temperature from 0° C. to 60° C. according to DIN EN ISO 6721:1996 procedure A with a LASD layer thickness of 3 mm.

Also disclosed herein is a method for producing a sound deadening coating on a surface of a component part or a device. The method comprises obtaining a two component polyurethane system comprising a Component A and Component B. Component A comprises a polyol and Component B comprises a polymeric isocyanate based on MDI. Either Component A or Component B or both components comprise a filler. The method includes mixing Components A and B, to form a mixture comprising the polyol, the polymeric isocyanate, and the filler; applying the mixture to a surface of a component part or a device to form a coating; and curing the coating to produce a sound deadening coating. The steps of applying and curing are performed at an ambient temperature of from 10° C. to 40° C. The maximum loss factor at 2nd order (100-150 Hz) of the produced sound deadening coating is 0.1 or greater when measured at a temperature from 0° C. to 60° C. according to DIN EN ISO 6721:1996 procedure A for a sound deadening coating thickness of 3 mm.

The mixture can be applied at an application temperature of from 5° C. to 100° C. Preferably, the mixture can be applied at an ambient temperature i.e. it is not heated prior to application. Ambient temperature, in a manufacturing facility can be from 10° C. to 40° C., or even from 15° C. to 30° C. The coating is also cured at ambient temperature. In the methods of the present disclosure, heating during application and/or curing or the use of heating means is not required. The application and curing at ambient temperature are advantageous, especially in an automated production line.

The mixture is suitable to be applied at an ambient temperature from 10° C. to 40° C. and cure at said ambient temperature. The resulting polyurethane coating is the sound deadening coating having a maximum loss factor of 0.1 or greater when measured at a temperature from 0° C. to 60° C.

In some aspects, the component part is a component part of a household appliance or of a household appliance component, and the density of the mixture of Components A and B is higher than 1.7 g/cm3, and the maximum loss factor at 2nd order (100-150 Hz) of the sound deadening coating is 0.1 or greater when measured at 25° C. according to DIN EN ISO 6721:1996 procedure A with a LASD layer thickness of 3 mm.

In some aspects, the component part is a component part of an automobile or of an automotive component, wherein the density of the mixture of Components A and B is lower than or equal to 1.7 g/cm3, and wherein the maximum loss factor at 2nd order (100-150 Hz) of the sound deadening coating is 0.1 or greater when measured at 15° C. according to DIN EN ISO 6721:1996 procedure A with a LASD layer thickness of 3 mm.

In some aspects, the density of the mixture of Components A and B is from 0.7 to 1.2 g/cm3 at 23° C., and the maximum loss factor of the sound deadening coating is 0.1 or greater when measured at a temperature from 7° C. to 40° C. when measured by Oberst-measurement as described in procedure A of DIN EN ISO 6721-3:1996 with a layer thickness of 3 mm and second order determination.

In some aspects, the density of the mixture of Components A and B is from 1.8 to 2.2 g/cm3 at 23° C., and the maximum loss factor of the sound deadening coating is 0.1 or greater when measured at a temperature from 17° C. to 45° C. when measured by Oberst-measurement as described in procedure A of DIN EN ISO 6721-3:1996 with a layer thickness of 3 mm and second order determination.

In some aspects, Component A or Component B or both and the mixture comprises a polyurethane polymerization catalyst. In some aspects, Component A comprises as obligatory components polyol, filler and a polyurethane polymerization catalyst, preferably in the amounts of 20 to 60 vol. % of the filler, more than 0 and up to 0.5 vol. % of the polyurethane polymerization catalyst, and the balance adding up to 100 vol % being polyol, and as optional components: 0 to 3 vol. % of a rheological additive, 0 to 3 vol. % of an adhesion promoter, 0 to 3 vol. % of a drying agent, 0 to 2 vol. % of a dispersing additive, and 0 to 20 vol.-% of a flame retardant. In some aspects, Component B comprises as obligatory components more than 0 and up to 100 vol. % of an isocyanate, and as optional components 0 to 50 vol. % of a filler, and 0 to 6 vol. % of a rheological additive; and the vol. % are in relation to the total volume of the component.

In some aspects, the mixing ratio of Component A to Component B is in the range of from 1.1:1 to 8:1 by volume, preferably from 2:1 to 6:1 by volume, more preferably from 3:1 to 5.5:1 by volume, more preferably from 3:1 to 5:1 by volume. In some aspects, the isocyanate is based on MDI.

Also disclosed herein is a washing machine, dryer or dishwasher, or a component part thereof, comprising the coating of any one of the methods disclosed herein. Disclosed herein is a vehicle or vehicle part, the vehicle being selected from the group consisting of automobiles, airplanes, trains, rail vehicles, recreational vehicles, motorcycles, buses, space ships, submarines, agricultural vehicles, trucks, and boats, comprising the coating of any one of the methods disclosed herein. Disclosed herein is a device or component part comprising a surface coated with a polyurethane coating obtainable by the method according to any one of the methods disclosed herein, wherein the vibration of said coated surface when vibrating is reduced due to said polyurethane sound deadening coating when compared to the vibration of the uncoated surface, and wherein the maximum loss factor is 0.1 or greater when measured at a temperature from 0° C. to 60° C.

Disclosed herein is a device or component part comprising a surface coated with a polyurethane coating obtained by the methods described herein, wherein the vibration of said coated surface when vibrating is reduced due to said polyurethane sound deadening coating when compared to the vibration of the uncoated surface, and wherein the maximum loss factor is 0.1 or greater, 0.15 or greater, or even 0.2 or greater when measured at a temperature from 0° C. to 60° C.

DEFINITIONS

Figure 1:
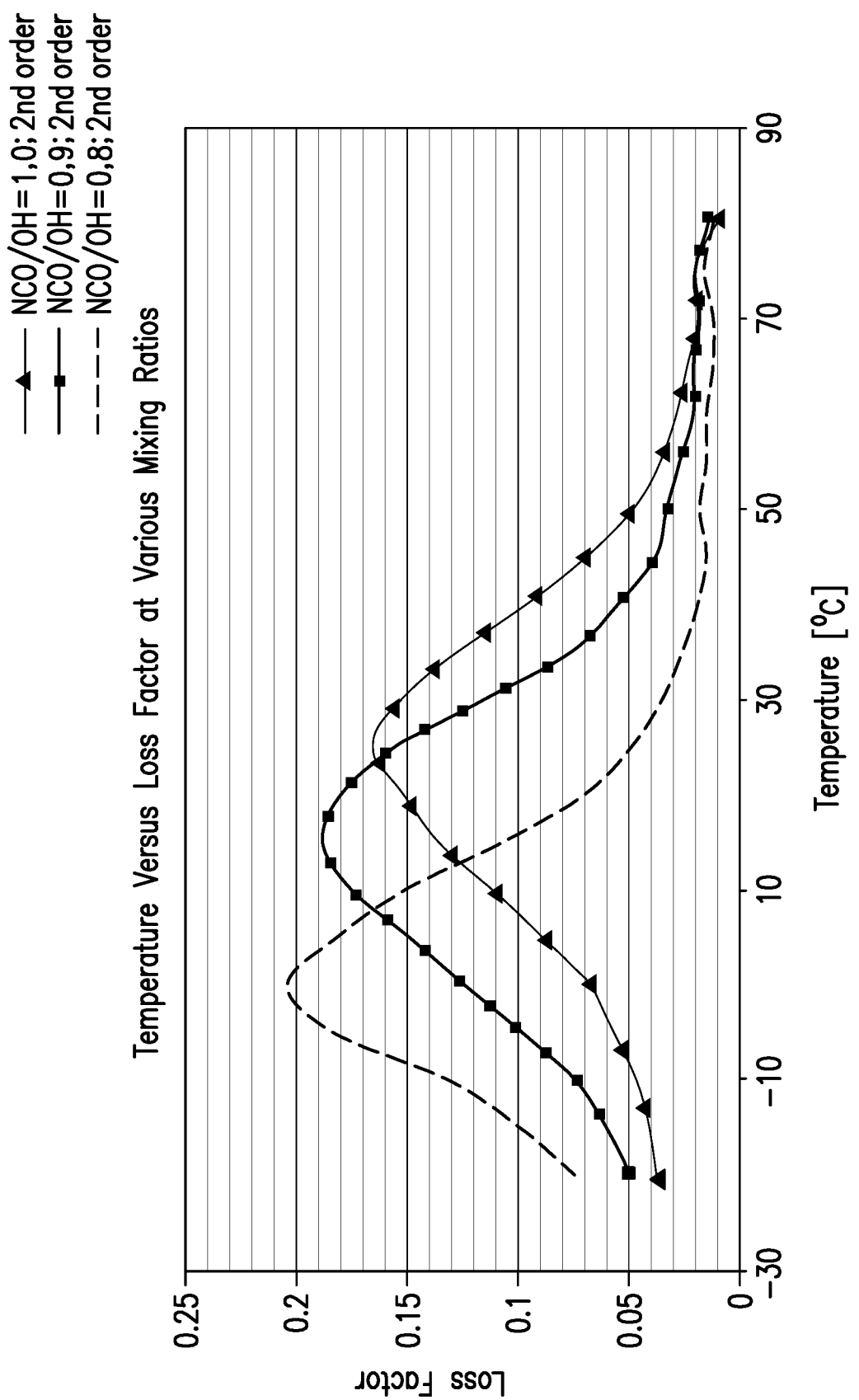
FIG. 1 shows the results of the Oberst measurement, at $2^{nd}$ order, of the loss factor at different temperatures for the compositions of Example 1 with an NCO/OH ratio of 0.8, 0.9, and 1.0 at a layer thickness of 3.0 mm.

The following definitions are applied in the context of the present invention:

The article "a" or "an" means "one or more" unless indicated otherwise.

All wt. % values are given in relation to the total weight of the composition in question. All vol. % are given in relation to the total volume of the composition in question, unless indicated otherwise.

Wherever a numerical range is given, any number within this range shall also be considered to be individually disclosed.

Damping performance, in the context of the present invention, is given as "loss factor", measured with the Oberst measurement method according to procedure A of DIN EN ISO 6721-3:1996. "Loss factor" is the ratio between the loss modulus and the storage modulus. The loss factor, expressed as a dimensionless number, is commonly used as a measure of the damping in a viscoelastic system. It is given for a certain temperature and a certain frequency or frequency range. Furthermore, it is usually given together with the order of vibration analysis via Fourier transformation, e.g. $2^{nd}$ order. The damping maximum is measured by performing the Oberst measurement method according to procedure A of DIN EN ISO 6721-3:1996 at different temperatures, e.g. at temperatures from 0° C. to 80° C., and determination of the highest loss factor value within this temperature range. The damping maximum is given as the temperature at said loss factor.

The damping effect is correlated to the layer thickness and the mass per unit area: the higher the thickness and, as a consequence of this, the mass per unit area, the higher the damping effect.

All Industrial Standards cited herein (e.g., EN ISO standards) are the standards in their most recent version at the filing date of the present application, unless explicitly stated otherwise (e.g., DIN EN ISO 6721 is herein referred to in its version DIN EN ISO 6721-3:1996).

A "high density LASD" is an LASD wherein the mixture of Components A and B has a density of higher than 1.7 g/cm$^3$. Preferably, the density of the high density LASD is from 1.8 g/cm$^3$ to 3.0 g/cm$^3$, more preferably from 1.8 g/cm$^3$ to 2.6 g/cm$^3$, even more preferably from 2.0 g/cm$^3$ to 2.4 g/cm$^3$.

A "low density LASD" is an LASD wherein the mixture of Components A and B has a density of equal to or less than 1.7 g/cm$^3$. Preferably, the density of the low density LASD is from 0.5 g/cm$^3$ to 1.6 g/cm$^3$, more preferably from 0.7 g/cm$^3$ to 1.3 g/cm$^3$, even more preferably from 0.8 g/cm$^3$ to 1.2 g/cm$^3$.

DETAILED DESCRIPTION

The present invention pertains to a two component polyurethane system for use as a liquid applied sound deadener (LASD). The LASD is formed from a reactive two component polyurethane system. The LASD is suitable to be applied by a flat stream extruder, which differentiates it from polyurethane based coatings which are applied by spraying. The latter typically cannot be applied successfully with a flat stream extruder because their viscosities are too low for this mode of application, i.e. it may result in inconsistent thicknesses because the application is difficult to control. The inventors have found that using a higher viscosity two component polyurethane systems helps avoid the problems of spray applied materials. The LASD provides at least one of the following advantages:

The LASD can be applied in liquid form using a flat-stream extruder.

The mixture of Components A and B can be applied vertically (for example applied from a dispenser in a direction away from the direction of gravity), or on slanted or curved surfaces. Thus, application is possible on surfaces whose coating with a sound deadener sheet or with a spray is difficult. In particular, an accurate and uniform application up to the edges of a coated surface is possible. In comparison with a spray, the advantage is that there is reduced risk of overspray or running.

The polyurethane cures at ambient temperatures (generally from 10° C. up to 40° C., preferably up to 35° C.; the higher the temperature, the higher the curing speed), which obviates the use of heating means such as a heater or oven in the production line, therefore simplifying production and saving energy.

The damping curve of the polyurethane passes through a damping maximum at a certain temperature. The damping properties can be tuned to the temperature of the environment in which the final work piece shall be used.

The position of the damping maximum is adjustable by the mixing ratio of components A and B of the polyurethane LASD.

The pot life of the mixed Components A and B is adjustable as desired, for example by the amount of catalyst added. The higher the catalyst amount, the shorter the pot life.

The polyurethane shows little or no volume shrinkage and has a low space requirement. In other words, it can be applied in manufacturing processes with that may have limited operating space.

The application of the LASD according to methods disclosed herein has a high automation potential.

The ability to cure at ambient temperature, generally a temperature within the range from 10° C. to 40° C., and of an accurate application of the coating are especially advantageous.

In the following, the invention will be explained in more detail. It shall be understood that features and preferred features of the invention described in separate parts of the description may be combined with each other unless explicitly stated otherwise or unless such combination is not possible for scientific reasons. Such combinations are also part of the present invention.

Composition of the Polyurethane System

The present invention pertains to a two component polyurethane system for use as a LASD. The two components are Component A and Component B.

Component A comprises the polyol. In addition, it may comprise one or more of a filler, a polyurethane polymerization catalyst, a rheological additive, a flame retardant, an adhesion promoter and a drying agent. Further conventional additives, like colorants and antioxidants may also be comprised in Component A.

Component B comprises the isocyanate for forming the polyurethane. In addition, it may comprise a filler, a polyurethane polymerization catalyst, a flame retardant and/or a rheological additive. Further conventional additives, like colorants and antioxidants may also be comprised in Component B.

Component A

In the two component polyurethane system the component which comprises the polyol is Component A. The polyol that can be used in Component A may be any polyol generally used for preparation of polyurethane. The polyol may also include dioles.

The polyol preferably has a hydroxyl functionality from 1.5, 2, or 3, to 3.5, 4, or 4.5, or a value between any pair of the foregoing values. For example, suitable polyols may be those having a hydroxyl functionality of at least 1.5, at least 2, at least 3, to no greater than 4, or even no greater than 3.5. Within these constraints, useful polyol(s) have hydroxyl numbers that vary over a wide range including, e.g., from 2 to 1,200, or from 25 to 1,000, or from 80 to 1,000.

The polyol (independently of its type) preferably has a number average molecular weight (Mn) of no less than 100 g/mol, more preferably from 100 g/mol to 18,000 g/mol. A range from 100 g/mol to 12000 g/mol is even more preferred, more preferably from 100 g/mol to 6000 g/mol, even more preferably from 100 g/mol to 4000 g/mol.

The polyol is preferably liquid at ambient temperature. Examples of useful classes of polyols include polyether polyols, polyester polyols, polyether/polyester polyols, polycarbonate polyols, polydiene polyols, hydroxyl functional natural oil polyols, and combinations thereof.

Useful polyether polyols can be obtained from the polymerization of a cyclic oxide, e.g., ethylene oxide, propylene oxide, butylene oxide, and tetrahydrofuran, or by the addition of one or more such oxides to polyfunctional initiators having at least two active hydrogens including, e.g., water, polyhydric alcohols (e.g., ethylene glycol, propylene glycol, diethylene glycol, cyclohexane dimethanol, glycerol, trimethylol-propane, pentaerythritol and bisphenol A), ethylenediamine, propylenediamine, triethanolamine, and 1,2-propanedithiol. Particularly useful polyether polyols include, e.g., polyoxypropylene diols and triols, poly(oxyethylene-oxypropylene) diols and triols obtained by the simultaneous or sequential addition of ethylene oxide and propylene oxide to appropriate initiators, and polytetramethylene ether glycols obtained by the polymerization of tetrahydrofuran. Examples of preferred polyether polyols include a poly (alkylene oxide), such as poly(propylene oxide), poly(ethylene oxide) and ethylene oxide/propylene oxide copolymer, with poly(propylene oxide) being most preferred.

Suitable commercially available polyether polyols are available under a variety of trade designations including, e.g., under the VORANOL® series of trade designations including, e.g., VORANOL 220-56, VORANOL 220-110, VORANOL 220-260, VORANOL 230-56, VORANOL 230-110, and VORANOL 230-238 from Dow Chemical Co. (Midland, Michigan), or the DESMOPHEN® series, e.g. DESMOPHEN 1380 BT, 1381 BT, 1400 BT, 2060 BD, 2061 BD, 3061 BT, 4011 T, 4028 BD, available from Covestro, Germany.

Useful polyester polyols include those polyester polyols prepared from the reaction product of polycarboxylic acids, their anhydrides, their esters or their halides, and a stoichiometric excess polyhydric alcohol. Suitable polycarboxylic acids include dicarboxylic acids and tricarboxylic acids including, e.g., aromatic dicarboxylic acids, anhydrides and esters thereof (e.g. terephthalic acid, isophthalic acid, dimethyl terephthalate, diethyl terephthalate, phthalic acid, phthalic anhydride, methyl-hexahydrophthalic acid, methyl-hexahydrophthalic anhydride, methyl-tetrahydrophthalic acid, methyl-tetrahydrophthalic anhydride, hexahydrophthalic acid, hexahydrophthalic anhydride, and tetrahydrophthalic acid), aliphatic dicarboxylic acids and anhydrides thereof (e.g. maleic acid, maleic anhydride, succinic acid, succinic anhydride, glutaric acid, glutaric anhydride, adipic acid, pimelic acid, suberic acid, azelaic acid, sebacic acid, chlorendic acid, 1,2,4-butane-tricarboxylic acid, decanedicarboxylic acid, octadecanedicarboxylic acid, dimeric acid, dimerized fatty acids, trimeric fatty acids, and fumaric acid), alicyclic dicarboxylic acids (e.g. 1,3-cyclohexanedicarboxylic acid, and 1,4-cyclohexanedicarboxylic acid), and combinations thereof.

Suitable commercially available polyester polyols are available under a variety of trade designations including, e.g., under the STEPANPOL series of trade designations including, e.g., BC180, PC1011-55, PC1011-210, PC-1017P-55, PC-1028P-210, PC-1040P-55, PC-107-110, PC-2011-225, PC-2019-55, PC-207-125, PC-5040-167, PC-5070P-56, PD-195, PD320, PDP-70, and PS-2002 (from Stepan Company of Evansville, Illinois).

Examples of suitable polyhydric alcohols (i.e., polyols) from which the polyester polyols can be derived include aliphatic polyols, e.g., ethylene glycols, propane diols (e.g., 1,2-propanediol and 1,3-propanediol), butane diols (e.g., 1,3-butanediol, 1,4-butanediol, and 1,2-butanediol), 1,3-butenediol, 1,4-butenediol, 1,4-butynediol, pentane diols (e.g., 1,5-pentanediol), pentenediols, pentynediols, 1,6-hexanediol, 1,8-octanediol, 1,10-decanediol, neopentyl glycol, diethylene glycol, triethylene glycol, tetraethylene glycol, polyethylene glycols, propylene glycol, polypropylene glycols (e.g., dipropylene glycol and tripropylene glycol), neopentylglycol, 1,4-cyclohexanedimethanol, 1,4-cyclohexanediol, dimer diols, hydrogenated bisphenol A, hydrogenated bisphenol F, polycaprolactone polyols, tetramethylene glycol, polytetramethylene glycol, 3-methyl-1,5-pentanediol, 1,9-nonanediol, 2-methyl-1,8-octanediol, trimethylolpropane, glycerin, pentaerythritol, sorbitol, glucose, and combinations thereof.

Polydiene polyols are also suitable. A preferred polydiene polyol is polybutadiene polyol, especially hydroxy terminated polybutadiene (e.g., Poly bd® 45 HTLO from Cray Valley, France, having an OH number of 47.1 KOH/g and a molecular weight Mn of 2800 g/mol, or Vorapel® D3201, having an OH number of 56, available from DOW Chemical, USA).

Suitable natural oil polyols have hydroxyl functionality of from 1 to 8, and preferably from 1.5 to 4. Examples of suitable natural oil polyols include hydroxy functionalized oils or hydroxy functional triglycerides that are isolated from, derived from, or manufactured from natural oils including animal and vegetable oils, preferably vegetable oils. Examples of vegetable and animal oils that may be used include soybean oil, safflower oil, linseed oil, corn oil, sunflower oil, castor oil, olive oil, canola oil, sesame oil, cottonseed oil, palm oil, rapeseed oil, tung oil, fish oil, and blends thereof. Other suitable oil polyols include polyols derived from modified natural oils including, e.g., partially hydrogenated natural oils, natural epoxidized oils, genetically modified natural oils, and combinations thereof. Examples of such oils include, but are not limited to, high oleic safflower oil, high oleic soybean oil, high oleic peanut oil, high oleic sunflower oil (such as NuSun® sunflower oil from the National Sunflower Association in Mandan, North Dakota), high oleic canola oil, high erucic rapeseed oil, and crambe oil. Castor oil is a preferred natural oil in the context of present application.

Suitable commercially available hydroxy functional triglycerides are available under a variety of trade designations including, e.g., under the #1 Castor Oil trade designation from Acme-Hardesty Co. (Blue Bell, Pennsylvania), or under the AGROL series of trade designations including, e.g., AGROL 2.0, AGROL 3.6, AGROL 4.0, AGROL 3.0 AO from BioBased Technologies (Springdale, Arkansas) Suitable polycarbonate polyols include, e.g., polycarbonate polyols derived from dimethyl carbonate and a polyol, suitable examples of which include aliphatic polyols, e.g., ethylene glycols, propylene glycols, propane diols (e.g., 1,2-propanediol and 1,3-propanediol), butane diols (e.g., 1,3-butanediol, 1,4-butanediol, and 1,2-butanediol), 1,3-butenediol, 1,4-butenediol, 1,4-butynediol, pentane diols (e.g., 1,5-pentanediol), pentenediols, pentynediols, 1,6-hexanediol, 1,8-octanediol, 1,10-decanediol, neopentyl glycol, diethylene glycol, triethylene glycol, tetraethylene glycol, polyethylene glycols, propylene glycol, polypropylene glycols (e.g., dipropylene glycol and tripropylene glycol), neopentyl glycol, 1,4-cyclohexanedimethanol, 1,4-cyclohexanediol, dimer diols, bisphenol A, bisphenol F, hydrogenated bisphenol A, hydrogenated bisphenol F, tetramethylene glycol, polytetramethylene glycol, 3-methyl-1,5-pentanediol, 1,9-nonanediol, 2-methyl-1,8-octanediol, trimethylolpropane, glycerin, pentaerythritol, sorbitol, glucose, and combinations thereof, as well as polyols derived from organic oxides such as ethylene oxide and propylene oxide.

Diols and triols may be used as chain extenders or chain branchers in Component A, for example to adjust a low NCO/OH ratio by increasing the number of OH-groups available. As explained further below, lowering the NCO/OH ratio can be used to shift the damping maximum of the resulting LASD to a lower temperature. In some instances, raising the NCO/OH ratio can be used to shift the damping maximum of the resulting LASD to a higher temperature.

In a preferred embodiment, the polyol includes at least one of castor oil, polyether polyols, polyester polyols, polyether/polyester polyols, polydiene polyols, dipropylene glycol, and combinations of two or more thereof.

In a more preferred embodiment, the polyol is selected from the group consisting of castor oil, polyether polyols, polyester polyols, polydiene polyols (in particular polybutadiene polyols), dipropylene glycol, and combinations thereof.

In an even more preferred embodiment, the polyol is selected from the group consisting of castor oil and polyether polyols, in particular consisting of castor oil and polypropylene glycol. The polypropylene glycol is preferably bifunctional or trifunctional; a mixture of polypropylene glycol with different functionalities, e.g. of bifunctional and trifunctional glycols may also be used.

The most preferred polyols are the polyols and combinations of polyols used in the Examples.

In a first embodiment of the invention, Component A comprises as obligatory components polyol, fillers and a polyurethane polymerization catalyst, in the amounts of 20 to 60 vol. % of filler, more than 0 and up to 0.5 vol. % of the polyurethane polymerization catalyst, and the balance adding up to 100 vol. % being polyol; and as optional components 0 to 3 vol. % of a rheological additive, 0 to 3 vol. % of an adhesion promoter, 0 to 3 vol. % of a drying agent, 0 to 2 vol. % of a dispersing additive, and 0 to 20 vol. % of a flame retardant; wherein the vol. % are in relation to the total volume of the Component A.

Component A typically comprises two or more different polyols, and may also comprise two or more fillers.

The total polyol content of Component A is typically in the range from 5 to 80 wt. %, preferably in the range from 10 to 70 wt. %, even more preferably in the range from 20 to 60 wt. %.

The total filler content of Component A, if filler is present in A, can be from more than 0 and up to 95 wt. %, preferably in the range from 20 to 80 wt. %, more preferably in the range from 40 to 70 wt. %.

The polyol content and the filler content depend on whether a low density or a high density LASD is desired. In one case, the higher the desired density of the LASD, the higher the density of the filler used. A low density LASD is particularly suitable for example for vehicles and vehicle parts like automotive bodies. For a low density LASD, the density of Component A is typically in the range from 0.5 to 1.8 g/cm$^3$, preferably from 0.5 to 1.6, more preferably from 0.7 to 1.3. A preferred density is 1 g/cm$^3$. A high density LASD is particularly suitable for example for household appliances like dishwashers. The density of Component A for a high density LASD, is typically in the range from 1.8 to 2.8 g/cm$^3$, preferably from 2.0 to 2.6 g/cm$^3$, more preferably from 2.2 to 2.4 g/cm$^3$. A preferred density is 2.3 g/cm$^3$.

The density of the LASD made by mixing Component A and Component B depends on the ingredients of Component A and Component B, and on the mixing ratio.

In a preferred embodiment for a high density LASD, Component A comprises 10 to 35 wt. % of polyol; 50 to 80 wt. % of filler: 0.005 to 0.2 wt. % of a polyurethane polymerization catalyst; 0.1 to 2 wt. % of an adhesion promoter; 0.5 to 5 wt. % of a drying agent; and 0.1 to 3 wt. % of a dispersing additive; and optionally 0.2 to 4 wt. % of a rheological additive; and 5 to 30 wt.-% of a flame retardant.

In a preferred embodiment for a low density LASD, Component A comprises 35 to 70 wt. % of polyol; 20 to 50 wt. % of filler; 0.005 to 0.2 wt. % of a polyurethane polymerization catalyst; 0.1 to 2 wt. % of an adhesion promoter; 0.5 to 5 wt. % of a drying agent, and 0.1 to 3 wt. % of a dispersing additive; and optionally 0.2 to 4 wt. % of a rheological additive; and 5 to 30 wt. % of a flame retardant.

Furthermore, the viscosity of Component A can be from 50 Pas to 500 Pas at 23° C. when measured with spindle RV-7 according to the method described in the Examples, and/or to from 500 Pas to 5000 Pas, preferably from 500 Pas to 1500 Pas, at 23° C. when measured with T-bar spindle T-C as described in the Examples. When a T-bar spindle is used, it should be used together with a stand which is able to create a helical path through the material such as a Helipath™ stand (available from AMETEK Brookfield of Middleboro, Massachusetts).

Component B

In the present invention the component which comprises the isocyanate required for forming the polyurethane is Component B.

The isocyanate used in Component B may be any isocyanate which is conventionally used for polyurethane preparation in the art, or a combination of two or more of said conventional isocyanates. Such conventional isocyanate may be selected from the group consisting of monomeric isocyanates, polymeric isocyanates and isocyanate prepolymers. The isocyanate can generally be a polyfunctional isocyanate with a functionality of about 2 or more, such as 2.1 or more, 2.3 or more, 2.5 or more, or even 2.7 or more. In some embodiments, the functionality is about 2. The isocyanate can be aromatic or aliphatic. Representative examples of aromatic isocyanates include diphenyl methylene diisocyanate (MDI), tetramethyl xylene diisocyanate, naphthalene diisocyanate, toluene diisocyanate. Representative examples of aliphatic diisocyanates include hexamethylene diisocyanate, isophorone diisocyanate, hydrogenated MDI, dodecane isocyanate, dimer diisocyanate and all polymeric, trimeric isocyanates. In embodiments, the isocyanate can include MDI, tetramethylxylene diisocyanate, isophorone diisocyanate, toluene diisocyanate, hexamethylene diisocyanate or combinations thereof. In some embodiments, the isocyanate can comprise MDI. In one embodiment, the isocyanate is based on MDI. Component B may comprise a mixture of two or more isocyanates.

Preferably, the isocyanate used in Component B is a polymeric isocyanate. Polymeric isocyanate generally has a functionality that is greater than about 2; in some embodiments at least about 2.3; in some embodiments greater than about 2.3; and in some embodiments about 2.7. The functionality of polymeric MDI can be an indication of the expected cross-link density in end use applications.

Polymeric isocyanate is generally a mixture of isocyanate compounds. In embodiments, polymeric MDI can be a mixture of MDI (a diisocyanate), and higher functionality isocyanate polymers. For example, polymeric MDI can be a mixture of MDI, triisocyanate, tetra-isocyanate, penta-isocyanate, higher homologues, or combinations thereof.

Preferably, said polymeric isocyanate includes at least one of polymeric isocyanates based on MDI (4,4'-MDI), MDI-isomers (2,4'-MDI, 2,2'-MDI), higher functional homologues (PMDI) or prepolymers thereof, and combinations thereof. More preferably, the isocyanate is at least one of or at mixture of diphenylmethane-4,4'-diisocyanate (4,4'-MDI) with MDI-isomers (2,4'-MDI, 2,2'-MDI) and higher functional homologues (PMDI), for example those sold under the tradename DESMODUR® (available from Covestro AG, Germany). Tsocyanates based on MDI may be preferred because they have a relatively low toxicity because of their low vapour pressure at room temperature compared to other aromatic isocyanates like TDI or XDI or aliphatic isocyanates like IPDI or HDT. They further have a fast reactivity because they are aromatic isocyanates. Their low price and good adhesion properties are further advantages.

In a typical embodiment of the present invention, Component B consists of the isocyanate. However, it is also possible to add additives to the isocyanate, preferably additives selected from the group consisting of fillers, flame retardants and rheological additives. If Component B contains one or more of these additives, the balance to 100 wt. % is made up by the isocyanate.

In a first embodiment of the invention, Component B comprises as obligatory components more than 40 and up to 100 wt. % of at least one isocyanate; said isocyanate preferably comprises or consists of a polymeric isocyanate based on MDI; and as optional components 0 to 50 wt. % of a filler, and 0 to 6 wt. % of a rheological additive; wherein the wt. % are in relation to the total weight of the Component B.

Further conventional additives, like colorants and antioxidants may also be comprised in Component B. If a flame retardant is a further optional component of Component B, it is preferably present in an amount from 0 to 20 wt. %.

The density of Component B is typically in the range from 1.0 to 1.4 $g/cm^3$, preferably from 1.1 to 1.3 $g/cm^3$, more preferably from 1.15 to 1.25 $g/cm^3$. A preferred density is 1.2 $g/cm^3$.

In a preferred embodiment of the invention, one, some or all of the ingredients, insofar as they are present in Components A and/or B, are selected from the ingredients used in the examples. In a particularly preferred embodiment, all of the ingredients are the ingredients used in the Examples.

Additives

The two component polyurethane system of the present invention may comprise at least one filler. The filler may be present in Component A, in Component B, in both Components, or in the mixture formed thereof.

The filler used in Component A and optionally also in Component B may be any filler which is typically used in polyurethane systems in the art, or a combination of two or more of such conventional fillers. If both Component A and B comprise a filler, the filler in the two Components may be the same or different.

Preferably, the filler is at least one of calcium carbonate (e.g., precipitated, treated or untreated, chalk), barium sulfate (including barite), hollow or non-hollow microspheres (e.g. ceramic microspheres), glass bubbles, iron sulfide, iron oxide, bauxite, aluminum hydroxide, aluminum oxide, magnesium silicate hydrate, magnesium hydroxide, gypsum, calcium sulfate, clay, quartz silica, other silicates, organic fillers, metal powders, and combinations of two or more thereof.

In one preferred embodiment, a filler used in the present invention is calcium carbonate or barium sulfate or a combination thereof, more preferably barium sulfate. Said preferred filler may be used in combination with other fillers, or may be the only filler present in Component A.

Where a high density LASD is desired, e.g., for coating a household appliance or a part thereof, the filler is preferably a filler having a high density. Said high density of the filler is preferably from 2.3 to 5.5 $g/cm^3$, more preferably from 2.6 to 4.6 $g/cm^3$.

For a high density LASD, the filler is preferably calcium carbonate (e.g., precipitated, treated or untreated), barium sulfate, iron oxide, bauxite, aluminum hydroxide, aluminum oxide, magnesium hydroxide, gypsum, calcium sulfate, chalk, metal powders, or combinations of two or more thereof. In a preferred embodiment for a high density LASD, barium sulfate is a filler, preferably from 30 to 70 wt. % in Component A.

Where a low density LASD is desired, e.g., for coating a vehicle part, the filler is preferably a filler having a low density. Said low density of the filler is preferably from 0.1 $g/cm^3$ to 1.2 $g/cm^3$.

For a low density LASD, the filler is at least one of calcium carbonate (e.g., precipitated, treated or untreated), hollow or non-hollow microspheres (e.g., ceramic microspheres), glass bubbles, silica, and combinations of two or more thereof. In a preferred embodiment for a low density LASD, hollow microspheres or glass bubbles are a filler, preferably in an amount from 10 to 50 wt. % in Component A.

A polymerization catalyst suitable for use in the present invention is any catalyst which is typically used for polymerization of two component polyurethane systems, i.e. a polyurethane polymerization catalyst. Such catalysts are known in the art.

Preferably, the polymerization catalyst is at least one of metallic carboxylates and dibutyl tin dilaurate (DBTL). Useful metallic carboxylates include, e.g., cobalt carboxylates, manganese carboxylates, and mixtures thereof. Other useful catalysts include amine catalysts. Most preferably, the catalyst is dibutyl tin dilaurate (DBTL).

In some embodiments, Component A includes more than 0% by weight of the catalyst, e.g. 0.005% by weight or more. The preferred upper limit is 0.5% by weight catalyst based on the total weight of Component A. Preferably, the catalyst is contained in an amount from 0.001 wt. % to 0.5 wt. %, more preferably from 0.005 wt. % to 0.45 wt. %, more preferably from 0.01 wt. % to 0.4 wt. %, more preferably from 0.01 wt. % to 0.2 wt. %, more preferably from 0.015 wt. % to 0.1 wt. %.

The amount of catalyst has an influence on the pot life. The higher the amount of catalyst, the shorter the pot life. Thus, the pot life can by modified by changing the amount of catalyst.

A typical range of pot life is from 5 min to 15 min at 23° C., preferably from 8 min to 10 min at 23° C. Preferred pot life times are given in the Examples.

In some embodiments, a moisture-curing catalyst (e.g., amino-trialkylamines or 2,2'-dimorpholinodiethylether (DMDEE)) is present during the formation of the MDI prepolymer. This moisture curing catalyst does not contribute to the amount of the polymerization catalyst.

In some embodiments, a rheological additive may be included. Rheological additives suitable for the present invention may be chosen from any rheological additives which are conventional in the art for polyurethane systems. Preferably, the rheological additives are thixotropic agents. The rheological additives can be at least one of clay, pyrogenic silica, hydrogenated castor oil (e.g., RILANIT® from BASF of Ludwigshafen, Germany), amide waxes (e.g., DISPARLON from King Industries, Inc, of Norwalk, Connecticut), and mixtures of two or more thereof. Most preferably, the rheological additive is pyrogenic silica or a mixture of pyrogenic silica with other rheological additives. Rheological additives are optionally included to prevent sagging once applied to the substrate.

Useful adhesion promoters can be chosen from the adhesion promoters which are conventional in the art for polyurethane systems. Preferably, they are include at least one of organosilanes (in particular organofunctional silanes, e.g., organosilanes possessing a reactive organic epoxide and hydrolyzable inorganic methoxysilyl groups), organotitanates, organozirconates, halogenated polyolefines, and mixtures of two or more thereof. Functional organosilanes, e.g. the bifunctional organosilane possessing a reactive organic epoxide and hydrolyzable inorganic methoxysilyl groups used in the Examples, are especially preferred.

Useful drying agents may be chosen from any of the drying agents which are conventional in the art for polyurethane systems. Preferably, they include at least one of molecular sieves, calcium oxides, ortho-formiate, and mixtures of two or more thereof. Most preferably, the drying agent is a molecular sieve, or a mixture thereof with other drying agents. In Component B, the drying agent may also be p-toluenesulphonyl isocyanate (PTSI).

Dispersing additives such as dispersants or emulsifiers may be added to the Components A and or B as needed, for example to keep fillers dispersed and/or to avoid sagging. Examples of suitable dispersants include lecithins, such as soy lecithin, silicone polyether, or silicone polyester copolymers.

Useful flame retardants may any one of those which are conventional in the art for polyurethane systems. If a flame retardant is present in an LASD of the present invention, it is typically comprised in Component A; but it may also be present in Component B, either instead of or in addition to in Component A.

Preferably, flame retardants include at least one of metal hydroxides, metal oxides, metal salts, metal mixed hydroxide and/or oxide salts, carbon, phosphorus and nitrogen compounds, halogenated compounds, and mixtures of two or more thereof.

More preferably, they are selected from the group consisting of aluminum hydroxide, magnesium hydroxide, zinc borate, zinc oxide, zinc hydroxystannate, expandable graphite, and mixtures of two or more thereof. The most preferred flame retardant to be used in the present invention as ingredient of the LASD is aluminum hydroxide, which is either used as the sole flame retardant or in combination with one or more other flame retardants. Aluminum hydroxide being the sole flame retardant being most preferred.

In some instances, flame retardants are also fillers. In embodiments where the flame retardant is also a filler, the total amount of fillers in a Component given herein includes the amount of any flame retardant which is also a filler.

Components A and B according to the present invention may optionally include one or more other conventional additives including, e.g., antioxidants, plasticizers, colorants (e.g., pigments and dyes), surfactants, and mixtures thereof. These other additives are typically contained in a total amount of no more than 2 wt. %, based on the total weight of the component in question.

The particulate ingredients of the LASD of the present invention have particle sizes which are conventional in the art for two component polyurethane systems which are applied by extruder using a static mixer.

For the particulate ingredients of the LASD of the present invention, e.g. for chalk, barium sulfate, and fumed silica, the particle size distribution is a distribution which is conventional in the art. Typically, the D90 is less than or equal to 100 μm when determined by laser diffractometer particle analyzer (such as a Mastersize 3000™ (available from Malvern Panalytical located in Malvern, United Kingdom) with dispersion module Hydro MV).

For microspheres, may they be ceramic or glass, the D90 is typically less than 300 μm when determined by laser diffractometer particle analyzer (Mastersize 3000™ (Malvern Panalytical, Malvern, United Kingdom) with dispersion module Hydro MV).

Mixture of A and B

To form the LASD composition, Components A and B are mixed at the desired ratio. Upon mixing of the two components A and B, polymerization starts and the polyurethane is formed begins forming. The composition and the mixing ratio of Component A and B in the mixture can be varied such that an equivalent ratio of isocyanate groups to polyol hydroxy groups as desired for the particular application is obtained.

While Components A and B, depending in their individual composition may be mixed in any ratio to obtain a NCO/OH ratio from 0.55 to 1.2, typically, the mixing ratio of Component A to Component B is in the range of from 1.1:1 to 8:1 by volume. Preferably the mixing ratio of Component A to Component B is from 2:1 to 6:1 by volume, more preferably from 3:1 to 5.5:1 by volume, more preferably from 3:1 to 5:1 by volume.

A ratio below 0.55 might result in insufficient adherence of the coating to the substrate. Moreover, by incomplete crosslinking, the material may not cure anymore. Furthermore, the cured material may become liquid by heating. A ratio above 1.2 may lead to incorporation of an undesired high amount of urea groups in the final coating, due to moisture curing.

The viscosity of the mixture of Component A and B can be from about 10 Pas, about 25 Pas, or about 50 Pas, to about 150 Pas, about 250 Pas, about 500 Pas, about 1000 Pas, or a viscosity between any pair of the foregoing values at 23° C. when measured with spindle RV-7 according to the method described in the Examples. For example, the viscosity of the mixture of Component A and B may be from 10 Pas to 250 Pas at 23° C., 25 Pas to 250 Pas at 23° C., or even 50 Pas to 150 Pas when measured with spindle RV-7.

Generally, a higher viscosity enables the application of the mixture using a slot die and an extruder without over spray, running, or dripping. Furthermore, this viscosity allows the application by a dispenser onto a surface which is vertical, slanted, curved, or overhead in relation to the dispenser.

Generally, the lower the viscosity, the lower the amount of Component A in the mixture of Component A and B. Thus, the viscosity of the mixture can be tuned by changing the amount of Component A in the mixture.

The viscosity measurement technique is outlined in the methods disclosed in the Examples. Those of skill in the art will be able to choose a suitable spindle and rotational speed for measuring the viscosity of Component A, Component B, or a mixture of the two. For example, the spindle size may be selected based on the material to be measured, such as whether it is Newtonian or non-Newtonian, or what the viscosity range is estimated to be, in order to get a suitably accurate measurement. In another example, a suitable rotational speed may be selected when using an R-7 spindle when measuring non-Newtonian fluids. When measuring non-Newtonian fluids a T-bar spindle may be used. When a T-bar spindle is used, it is often helpful to use a stand that is able to help the spindle trace a helical path through the material, such as a Helipath™ stand (AMETEK Brookfield of Middleboro, Massachusetts) or a similar device. This technique enables the spindle to trace a path through the material to be measured that is relatively undisturbed.

In one preferred embodiment, the LASD is a low density LASD and the density of the mixed Components A and B is equal to or lower than 1.7 g/cm³, preferably in a range from 0.7 to 1.2 g/cm³ at 23° C. For said low density LASD, the damping maximum is preferably in a range from 7° C. to 23° C.

In a low density LASD, the filler in Component A has a low density. In a preferred embodiment, Component A comprises hollow microspheres or glass bubbles as a filler, preferably in a range of from 10 to 50 wt. %.

In a preferred embodiment of a low density LASD, Component A comprises 35 to 70 wt. % of polyol, 20 to 50 wt. % of filler, 0.005 to 0.2 wt. % of a polyurethane polymerization catalyst, 0.1 to 2 wt. % of an adhesion promoter, and 0.5 to 5 wt. % of a drying agent, 0.1 to 3 wt. % of a dispersing additive, and optionally 0.2 to 4 wt. % of a rheological additive, 5 to 30 wt. % of a flame retardant; and Component B comprises 100 wt. % of polymeric isocyanate based on MDI or MDI-prepolymers, and the density of the mixture of Components A and B is equal to or lower than 1.7 g/cm³.

In another preferred embodiment, the LASD is a high density LASD and the density of the mixed Components A and B is higher than 1.7 g/cm³, preferably in a range from 1.8 to 2.2 g/cm³ at 23° C. For said low density LASD, the damping maximum is preferably in a range from 17° C. to 35° C.

In a high density LASD, the filler in Component A has a high density. In a preferred embodiment, Component A comprises barium sulfate as a filler, preferably in a range of from 30 to 70 wt. %.

In a preferred embodiment of a high density LASD, Component A comprises 10 to 35 wt. % of polyol, 50 to 80 wt. % of filler, 0.005 to 0.2 wt. % of a polyurethane polymerization catalyst, 0.1 to 2 wt. % of an adhesion promoter, and 0.5 to 5 wt. % of a drying agent, 0.1 to 3 wt. % of a dispersing additive, and optionally 0.2 to 4 wt. % of a rheological additive, 5 to 30 wt.-% of a flame retardant; and Component B comprises 100 wt. % of polymeric isocyanate based on MDI or MDI-prepolymers, and the density of the mixture of Components A and B is higher than 1.7 g/cm³.

The density at 23° C. of the mixture of Component A and component B is typically in the range from 0.7 to 3.0 g/cm³, preferably from 1.0 to 2.4 g/cm³. This density range is typically connected with a damping maximum in the range from 0° C. to 40° C. However, lower or higher damping maxima are also achievable.

One further advantage of the methods disclosed herein is the ability to tune the sound dampening properties of a liquid applied sound deadener by adjusting the mixing ratio of Components A and B in the two component polyurethane LASD. Preferably this adjustment is such that there is an excess of hydroxyl groups to generate incomplete crosslinking.

In the two component polyurethane system, the NCO/OH ratio can be used to adjust the damping properties of the LASD. For use as a liquid applied sound deadener according to the present invention, the mixing ratio of Component A and B in the mixture prepared for polymerization is chosen such that the ratio of isocyanate groups (NCO) to polyol hydroxyl groups (OH) in the mixture is preferably from 0.55 to 1.2.

FIG. 1 shows how the damping maximum is varied due to different mixing ratios. However, the temperature of the damping maximum is not only dependent on the NCO/OH ratio. Other influences are, e.g., the layer thickness, the kind of polyol, the amount of chain extender (e.g., diol or triol) present in the composition, and the density of the filler material. Hence, the NCO/OH ratio can be used to adjust the damping maximum, but it is not the only factor influencing the damping maximum. Nevertheless, the possibility of varying the damping maximum by adjusting the NCO/OH ratio is one of the advantages of the LASDs of the present invention.

In the preferred NCO/OH equivalent ratio range from 0.55 to 1.2, from 0.6 to 1.0, or even from 0.8 to 1.0 it has been found that the formation of a polyurethane coating is possible, that is particularly suitable as a LASD and sufficient sound deadening properties of the final polyurethane coating can be achieved. Typically, the lower the NCO/OH ratio, the lower the temperature of the maximum loss factor.

Thus, the LASDs of the present invention are advantageous because they allow their user an adjustment of the damping maximum by simply changing the ratio of NCO groups to OH groups in the LASD mixture. This can be done by changing the mixing ratio of Component A and B.

Substrate to be Coated

The two component polyurethane system of the present invention may be coated as LASD onto any substrate. Said substrate may be flat or curved, and its surface may be flat or structured. The two component polyurethane system of the present invention is especially useful for coating slated and angled surfaces, and for aligning the coating with high precision, e.g. to the edges of a substrate. Such high precision alignment is possible with the two component polyurethane system of the present invention because it can be applied with a flatstream extruder.

The substrate may be made of any material. The substrate is preferably made of a material selected from the group consisting of steel, stainless steel, coated steel (for example KTL-coated steel), aluminum, galvanized sheet metal, polymers, plastics, glass fiber reinforced plastics or polymers, wood, laminate (e.g., laminate flooring), and combinations of two or more of said materials. More preferably, the substrate is made of a material selected from the group consisting of steel, stainless steel, galvanized sheet metal, and combinations of two or more of said materials.

Device or Device Part to be Coated

The LASD according to the present invention may be applied on any surface of a substrate. In particular, it is possible to apply the LASD to a vertical, slanted, curved, or overhead surface of the substrate.

The substrate is preferably part of an apparatus or product selected from the group consisting of household appliances (e.g., dishwasher, dryer, washing machine), vehicles, air planes, air conditioning appliances, agricultural machines, marine machines, spacecraft, boats, motorcycles, construction machines, ventilators, construction elements, furniture, pipelines, railways, embedments, motors, power transformers, roofing, elevators, and of parts thereof.

In a preferred embodiment, the substrate is part of a vehicle or of a vehicle part, the vehicle preferably being selected from the group consisting of automobiles, airplanes, trains, rail vehicles and boats. Even more preferred, the substrate is part of an automobile or of an automotive part (e.g., automotive body or automotive door).

In said embodiments, the LASD is preferably a low density LASD.

In another preferred embodiment, the substrate is part of a household appliance or of a household appliance part. In said embodiment, the LASD is preferably a high density LASD. The household appliance may be any household appliance which can vibrate. It is preferably a household appliance having a motor, in particular a household appliance selected from the group consisting of a dishwasher, washing machine, dryer, mixer, refrigerator, freezer, blender, food processor, and tumbler. It may be a dishwasher, washing machine or a dryer. For example, the household appliance may be (i) a dishwasher or a part thereof, wherein preferably the part of the dishwasher is a washing machine tub, housing, dryer drum, washing chamber, door, base, plinth, or a part thereof; or (ii) a dryer or a part thereof, wherein preferably the part of the dryer is a housing, dryer drum, door, base, plinth, or a part thereof; or (iii) a washing machine or a part thereof, wherein preferably the part of the washing machine is a tub, housing, door, base, plinth, or a part thereof.

In another preferred embodiment, the substrate is part of a sink, basin or tub, preferably a bath tub or kitchen sink. In said embodiment, the LASD is preferably a high density LASD.

One embodiment of the present invention is a device or device part comprising a surface coated with a polyurethane LASD according to the present invention, wherein the vibration of said coated surface is reduced due to said LASD coating when compared to the vibration of the uncoated surface.

Application Process for Coating the LASD onto a Surface

The LASD of the present invention can be applied to a substrate by extrusion (e.g. flatstream extrusion, bead extrusion, slot die extrusion, etc.), or any other method that applies a film or bead. Application by flatstream extruder is preferred.

The application of the LASD typically comprises mixing of Components A and B, e.g. in the mixing element of a flatstream extruder. Such mixing element may advantageously be a static mixer. Subsequently, the LASD is applied to the surface of a substrate.

Flatstream extruders are known in the art (e.g. from Atlas Copco of Nacka, Sweden, or Eisenmann intec of Erftstadt, Germany), and the skilled person will be able to select an appropriate flatstream extruder for applying the LASD of the present invention.

Preferably, a flatstream extruder for applying the LASD of the present invention comprises a two component dosing unit, e.g. a two component piston dosing unit (2-C piston dosing unit), a mixing element (preferably a static mixer), a temperature control for controlling the temperature of the single components and/or of the component mixture forming the LASD.

A preferred apparatus suitable for performing flatstream extrusion is the applicator by Atlas Copco which was used in the Examples. Preferably, it has the settings used in the Examples.

The application temperature for the LASD may be from 5° C. to 100° C., preferably 5° C. to 80° C., more preferably from 5° C. to 60° C., more preferably from 10° C. to 50° C., more preferably from 20° C. to 45° C., even more preferably from 35° C. to 40° C., most preferably at ambient temperatures.

The application may be performed partially or fully automatic and/or on-line on a production line. Preferably, it is performed fully automatic and on-line on a production line.

Subsequent to application of the LASD, the LASD is cured, at ambient temperatures, without heating or the use of heating means. The ambient temperature is the temperature in the manufacturing facility, from 10° C. to 40° C., preferably from 15° C. to 30° C., and more preferably from 20° C. to 25° C.

Polyurethane Layer

The polyurethane applied according to the present invention can be applied to form a layer having a thickness from about 0.5 mm, 1.0 mm, 2.0 mm, or about 3.0 to about 5.0 mm, 10 mm, 15 mm 20 mm, or a thickness between any pair of the foregoing values. A suitable thickness may preferably be a thickness within a range from 1 mm to 5 mm, preferably from 2 mm to 4 mm, more preferably from 2 mm to 3 mm.

The layer thickness contributes to the damping effect: the thicker the layer, the higher the damping effect.

The surface weight of the polyurethane layer may be from about 1 kg/m$^2$, 2 kg/m$^2$, or 3 kg/m$^2$, to as great as 10 kg/m$^2$, 15 kg/m$^2$, 20 kg/m$^2$, or about 40 kg/m$^2$, or any surface weight between any pair of the foregoing values.

Damping Effect

Figure 2:
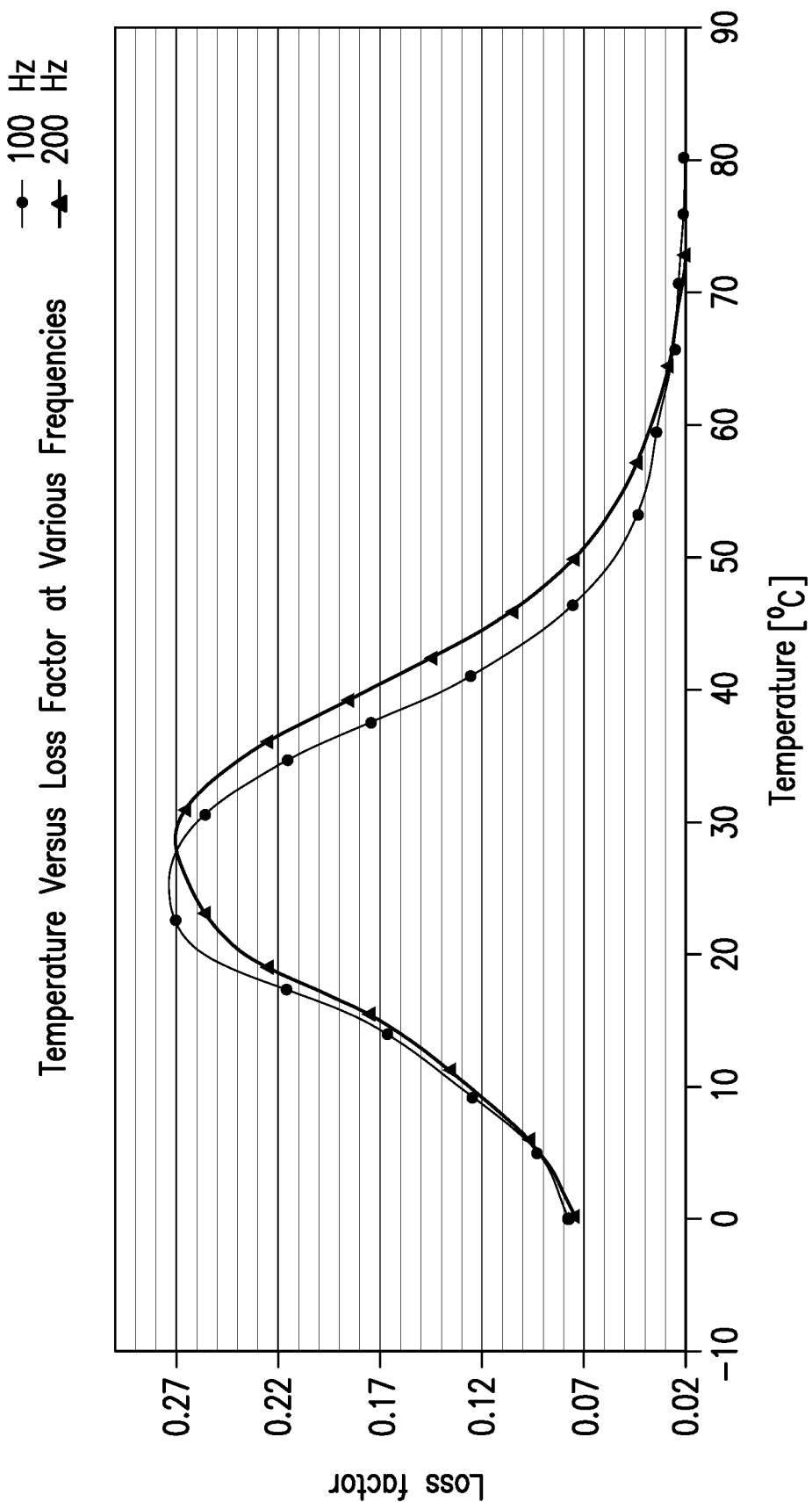
FIG. 2 shows the results of the Oberst measurement, at $2^{nd}$ order, of the loss factor at different temperatures for the composition of Example 2; the measurement frequencies were 100 Hz and 200 Hz; the layer thickness was 3.1; the area density was 6.2 kg/m$^2$.
Figure 3:
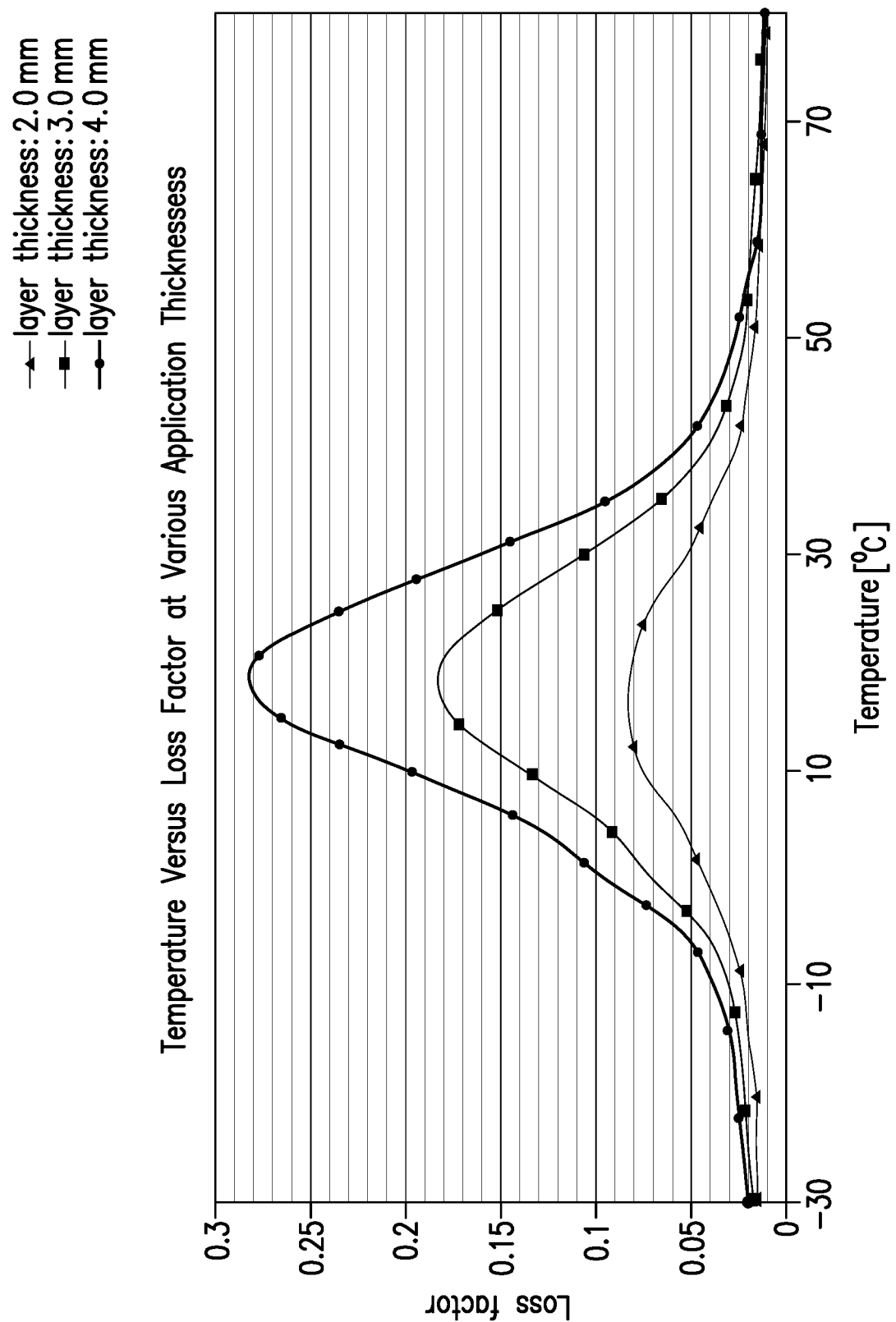
FIG. 3 shows the results of the Oberst measurement, at $2^{nd}$ order, of the loss factor at different temperatures for the composition of Example 3 with an NCO/OH ratio of 0.8.

The two component polyurethane system of the present invention is a liquid applied sound deadener (LASD). It provides a good loss factor over a wide temperature range, and excellent vibration-absorbing properties over a wide range of frequencies. Its damping effect is shown in FIGS. 1 to 3.

The polyurethane layer made from the LASD according to the present invention has a maximum loss factor at $2^{nd}$ order (100-150 Hz) of equal to or greater than 0.1 over the temperature range in which the measurements are obtained; the loss factor being determined according to the test method described in procedure A of DIN EN ISO 6721-3:1996 using an LASD layer thickness of 3 mm (±0.2 mm) and measured over a temperature range from −30° C. to 80° C.

As shown in the figures, the damping maximum of the LASD disclosed herein occurs at a temperature from −10° C. to 80° C., more preferably from 0° C. to 40° C., even more preferably from 10° C. to 35° C., and even more preferably from 15° C. to 25° C.

Preferably, when the density of the mixture of Components A and B is higher than 1.7 g/cm$^3$, the polyurethane layer made from the LASD according to the present invention has a loss factor at $2^{nd}$ order (100-150 Hz) of equal to or greater than 0.1 at 25° C.

In another preferred aspect, when the density of the mixture of Components A and B is equal to or lower than 1.7 g/cm$^3$, the polyurethane layer made from the LASD according to the present invention has a loss factor at $2^{nd}$ order (100-150 Hz) of equal to or greater than 0.1 at 15° C.

In particular, the LASD of the present invention has an excellent damping effect on sound in the low frequency range, for example on frequencies which are lower than 1000 Hz. The damping effect is particularly good in a frequency range from 10 Hz to 1000 Hz, even more in a frequency range from 100 Hz to 500 Hz, even more in a frequency range from 100 Hz to 250 Hz, and in particular in a frequency range from 100 Hz to 150 Hz.

The frequency range from 30 Hz to 10,000 Hz in particular from 100 Hz to 300 Hz, is monitored for evaluation of vibration damping in household appliances such as refrigerators, dishwashers, garbage disposals, blenders, and other devices that may produce noises through vibration when in operation. For example, noises produced when a dishwasher is in use, such as from an electrical motor and water splashing, are generally within this frequency range. For automotive vehicles, the damping properties at $2^{nd}$ order from 30 Hz to 10,000 Hz, or even 100 to about 150 are of particular interest, because this frequency corresponds to the typical vibration frequency resulting from the engine.

Useful loss factor values are at about 25° C. for high density LASD, and at about 15° C. for low density LASD. The reason for this is that high density LASDs are usually meant to work in devices such as household appliances, whilst low density LASDs are usually meant to work in vehicles. The usual average annual ambient temperature for a vehicle is 15° C., whilst the ambient temperature for household appliances is generally higher. Moreover, household appliances typically work at higher temperatures, e.g., the average working temperature for a dishwasher is 40° C.

The LASD of the present invention has a viscosity which advantageously allows for the composition to be applied using a flatstream extruder. This allows coating of those parts of a device which are usually poorly coated, e.g. the edges of surfaces or slanted or curved parts. The viscosity of the LASD even allows overhead application, which is very hard to achieve with precision when mats or foils are applied by hand. For application on slanted or curved surfaces, and for overhead application, the LASD of the present invention preferably comprises a thixotropic additive, for example pyrogenic silica. Said additive is preferably comprised in Component A.

Furthermore, the application is possible using a robot or other automation, either partially or fully on-line on a production line. This does not only optimize cost and precision, but also allows a user to vary the layer thickness over the coated area.

EXAMPLES

The invention will now be illustrated by the following Examples which describe specific embodiments of the present invention. The ingredients described in the Examples shall be understood as preferred ingredients of their kind. However, these Examples are provided for illustrative purposes only and are not intended to further limit the invention as described hereinabove.

All components of the compositions described in the Examples are, unless indicated otherwise, commercially available and of the usual commercial quality. All percent (%) values given in the Examples are wt. %, given in relation to the total weight of the composition in question, or vol. %, given in relation to the total volume of the composition in question unless indicated otherwise.

Example 1: High Density LASD without Flame Retardant

Component A:
 Polyols:
  Castor oil (OH value approximately 164 mg KOH/g).
  First bifunctional polypropylene glycol (OH value approx. 29 mg KOH/g).
  Second bifunctional polypropylene glycol (dipropylene glycol, OH value approximately 836 mg KOH/g).
 Fillers:
  Barium sulfate (ground barite with particle size (laser scattering) at d50 [μm] of approximately 9 (nine), and sieve residue (45 μm in % as measured according to DIN EN ISO 787-7) of approximately 4 (four)).
  Precipitated calcium carbonate (specific surface of approximately 21 m$^2$/g, and a coating content of 2.6%).
 Catalyst:
  Dibutyl tin dilaurate (DBTL)
 Adhesion Promoter:
  Silane (3-glycidyloxypropyltrimethoxysilane)
 Drying Agent:
  Molecular sieve (micronized, highly porous, crystalline aluminosilicate; nominal pore opening of 3 Angstrom (3 Å molecular sieve)).
 Dispersing Additive:
  Soy lecithin
Component B:
 Polymeric MDI (viscosity of 90 mPas, NCO content of 31.5%)

TABLE 1

Example 1 Composition of Components A and B

|  | Percent by volume | Percent by weight |
|---|---|---|
| Component A: | | |
| Castor oil | 25.6% | 10.0% |
| First bifunctional polypropylene glycol | 15.5% | 6.5% |
| Second bifunctional polypropylene glycol (dipropylene glycol) | 9.3% | 4.0% |
| DBTL | 0.2% | 0.1% |
| Molecular sieve | 1.7% | 2.0% |
| Barium sulfate | 35.8% | 66.0% |
| Silane | 2.2% | 1.0% |
| Soy lecithin | 0.9% | 0.4% |
| Precipitate calcium carbonate | 8.8% | 10.0% |
| Component B: | | |
| Polymeric MDI | 100% | 100% |

The density of Component A was 2.4 g/cm$^3$, and the density of Component B was 1.2 g/cm$^3$. The OH content of Component A was 219.2 mmol OH/100 ml. The viscosity of Component A was 200 Pas when measured with Brookfield RV viscometer (from AMETEK Brookfield of Middleboro, Massachusetts), spindle RV-7 at 10 rpm (23° C.), and 750 Pas when measured with Brookfield HB viscometer (AMETEK Brookfield), with a T-bar spindle T-C at 0.5 rpm (23° C., 1 min). The viscosity of Component B was 90 mPas when measured with a Brookfield RV viscometer, with spindle RV-7 at 10 rpm (23° C.).

The following mixtures were tested:
First Ratio Example: NCO/OH Ratio 0.8:
The mixing ratio of A:B for the LASD in this example was 5.2:1 by volume, corresponding to 10:1 by weight. The density of the cured product of A with B was: 2.2 g/cm$^3$ (as measured using Archimedes principle). The NCO/OH-ratio in the mixture of A with B was: 0.8. The viscosity of the mixture of A with B was approximately 100 Pas when measured with a Brookfield RV viscometer, spindle RV-7 at 10 rpm at 23° C. As shown in FIG. 1, the resulting LASD had a damping maximum at 0° C.
Second Ratio Example: NCO/OH Ratio 0.9:
The mixing ratio A:B for this LASD was 4.7:1 by volume, corresponding to 9.0:1 by weight. The density of the cured product of A with B was 2.2 g/cm$^3$. The NCO/OH-ratio in the mixture of A with B was 0.9. The viscosity of this mixture was approximately 95 Pas when measured with Brookfield RV viscometer, spindle RV-7 at 10 rpm and at 23° C. As shown in FIG. 1, the resulting LASD had a damping maximum at 15° C.
Third Ratio Example: NCO/OH Ratio 1.0:
The mixing ratio A:B for this LASD was 4.2:1 by volume, corresponding to 8.1:1 by weight. The density of the cured product of A with B was: 2.2 g/cm$^3$. The NCO/OH-ratio in the mixture of A with B was 1.0. The viscosity of the mixture was approximately 90 Pas when measured with Brookfield RV viscometer, spindle RV-7 at 10 rpm and at 23° C. As shown in FIG. 1, the resulting LASD had a damping maximum at 25° C.

Comparing the results of the examples described above in FIG. 1, the damping maximum can be tuned by varying the mixing ratio and the NCO/OH ratio. The lower the NCO content, i.e. the lower the NCO/OH ratio, the lower the temperature of the damping maximum. Increasing the NCO/OH ratio leads to an increase of the damping maximum. This is a high density LASD, suitable for example for household appliances like dishwashers. As these usually require a damping maximum at 40° C. or 25° C., a higher NCO/OH ratio is preferred for these appliances, for example, a ratio from 0.9 to 1.2, preferably from 1.0 to 1.2.

Example 2: High Density LASD with Flame Retardant

Component A:
Polyols:
Castor oil (OH value approximately 164 mg KOH/g).
Trifunctional polypropylene glycol (OH value 400 mg KOH/g).
First bifunctional polypropylene glycol (OH value approx. 29 mg KOH/g).
Second bifunctional polypropylene glycol (dipropylene glycol, OH value of approx. 836 mg KOH/g)
Fillers:
Barium sulfate (ground barite with particle size (laser scattering) at d50 [μm] of approximately 9 (nine), and sieve residue (45 μm in % as measured according to DIN EN ISO 787-7) of approximately 4 (four)).
Precipitated calcium carbonate (specific surface of approximately 21 m$^2$/g, and a coating content of 2.6%).
Rheological Additive:
Pyrogenic silica (synthetic, hydrophobic, amorphous silica, BET-surface area of approximately 120 m$^2$/g)
Catalyst:
Dibutyl tin dilaurate (DBTL)
Adhesion Promoter:
Silane (3-glycidyloxypropyltrimethoxysilane)
Drying Agent:
Molecular sieve (micronized, highly porous, crystalline aluminosilicate; nominal pore opening: 3 Angstrom (3 Å molecular sieve)).
Flame Retardant:
Aluminum hydroxide (oil absorption of 20-30 cm$^3$/100 g, particle size (laser scattering, Cilas) d50 [μm]: 15-25).
Dispersing Additive:
Soy lecithin
Component B:
Polymeric MDI (viscosity of 90 mPas, NCO content of 31.5%)

TABLE 2

Example 2 Composition of Components A and B

|  | Percent by volume | Percent by weight |
|---|---|---|
| Component A: | | |
| Castor oil | 17.8% | 7.5% |
| Trifunctional polypropylene glycol | 4.3% | 2.0% |
| Bifunctional polypropylene glycol | 4.3% | 2.0% |
| Dipropylene glycol | 21.5% | 9.9% |
| DBTL | 0.2% | 0.1% |
| Molecular sieve | 1.6% | 2.0% |
| Barium sulfate | 25.4% | 50.5% |
| Silane | 2.1% | 1.0% |
| Soy lecithin | 1.1% | 0.5% |
| Aluminum hydroxide | 13.8% | 15.0% |
| Precipitated calcium carbonate | 7.4% | 9.0% |
| Pyrogenic silica | 0.5% | 0.5% |
| Component B: | | |
| Polymeric MDI | 100% | 100% |

The density of Component A was: 2.2 g/cm$^3$, and density of Component B was: 1.2 g/cm$^3$. The OH content of Component A was 406.2 mmol OH/100 ml. The viscosity of Component A was 230 Pas when measured with Brookfield RV viscometer, spindle RV-7 at 10 rpm at 23° C.; and 880 Pas when measured with a Brookfield HB viscometer using a T-bar spindle T-C at 0.5 rpm and at 23° C. for 1 min. The viscosity of Component B was 90 mPas when measured with a Brookfield RV viscometer, spindle RV-7 at 10 rpm at 23° C.

The mixing ratio A:B for this LASD was 3.8:1 by volume, corresponding to 6.8:1 by weight. The density of the cured product of A with B was: 2.0 g/cm$^3$. The NCO/OH-ratio in the A+B mixture was 0.6; the pot life at 23° C. was 10 min. The viscosity of the mixture was approximately 110 Pas when measured with Brookfield RV viscometer, spindle RV-7 at 10 rpm and at 23° C.

This is a high density LASD, suitable for example for household appliances like dishwashers. As an added technical effect, it has flame-retardant properties because a flame retardant is present in Component A. The damping maximum of this LASD is within the range of from 25° C. to 30° C. See FIG. 2, which shows the results of Oberst measurements at a frequency of 100 Hz and 200 Hz for a layer thickness of 3.1 mm and a surface weight of 6.2 kg/m$^2$.

Example 3: Low Density LASD

Component A:
  Polyols:
    Castor oil with OH value: approx. 164 mg KOH/g:
    Bifunctional polypropylene glycol (dipropylene glycol, OH value: approx. 836 mg KOH/g)
  Fillers:
    Ceramic microspheres (particle size (laser scattering) of d50 [μm]: 70-90)
    Precipitated calcium carbonate (specific surface of approximately 21 m$^2$/g, and a coating content of 2.6%).
  Rheological Additive:
    Pyrogenic silica (synthetic, hydrophobic, amorphous silica, BET-surface area of approximately 120 m$^2$/g).
  Catalyst:
    Dibutyl tin dilaurate (DBTL)
  Adhesion Promoter:
    Silane (3-glycidyloxypropyltrimethoxysilane)
  Drying Agent:
    Molecular sieve (micronized, highly porous, crystalline aluminosilicate; nominal pore opening: 3 Angstrom (3 Å molecular sieve)).
  Dispersing Additive:
    Soy lecithin
Component B:
    Polymeric MDI (viscosity of 90 mPas, NCO content of 31.5%)

TABLE 3

Example 3 Composition of Components A and B

|  | Percent by volume | Percent by weight |
|---|---|---|
| Component A: | | |
| Castor oil | 48.1% | 45.6% |
| Dipropylene glycol | 7.3% | 7.5% |
| DBTL | 0.4% | 0.4% |
| Molecular sieve | 0.9% | 2.5% |
| Silane | 0.9% | 1.0% |
| Soy lecithin | 1.5% | 1.5% |
| Precipitated calcium carbonate | 3.6% | 10.0% |
| Ceramic microspheres | 36.4% | 29.5% |
| Pyrogenic silica | 0.9% | 2.0% |
| Component B: | | |
| Polymeric MDI | 100% | 100% |

The density of Component A was 1.0 g/cm$^3$, and the density of Component B was 1.2 g/cm$^3$. The OH content of Component A was 241.1 mmol OH/100 ml. The viscosity of Component A was 140 Pas when measured with Brookfield RV viscometer, spindle RV-7 at 10 rpm (23° C.), and 690 Pas when measured with Brookfield HB viscometer, T-bar spindle T-C at 0.5 rpm (23° C., 1 min). The viscosity of Component B was 90 mPas when measured with Brookfield RV viscometer, spindle RV-7 at 10 rpm (23° C.).

The mixing ratio A:B for this LASD was 4.8:1 by volume, corresponding to 3.8:1 by weight. The density of the mixture of Components A and B was: 1.0 g/cm$^3$. The NCO/OH-ratio in the A with B mixture was: 0.8. Pot life at 23° C.: 12 min. The viscosity of the mixture was approximately 70 Pas when measured with Brookfield RV viscometer, spindle RV-7 at 10 rpm and at 23° C.

This is a low density LASD, suitable for example for vehicles and vehicle parts like automotive bodies. The damping maximum of this LASD is within the range of from 15° C. to 20° C., depending on the layer thickness. FIG. 3 shows the results of the Oberst measurements for three different layer thicknesses.

Method 1: Flatstream Extruder Application

The coatings measured in Examples 1 to 3 were applied by hand in a laboratory. Comparative tests (not shown) demonstrated that the damping properties of the coatings did not significantly vary between hand coated and flatstream coated substrates.

The Components A and B of an LASD as described in these Examples may be applied to a substrate using a flatstream extruder as follows. The substrate is an Oberst bar made of spring steel as described in Method 5. The flatstream extruder may be a flatstream extruder by Atlas Copco with a slot die (flatstream nozzle), an SYS6000 2K control unit, a two component piston dosing unit (an ADKE 6000_0200 dosing unit for Component A and an ADKE 6000_0080 dosing unit for Component B), a mixing throttle MVS-2K with centric feed of the Component B, temperature control and a static mixer (Sulzer, 8 single segments; SCA-No. 80725.000050).

The flatstream extruder application may result in coatings having a thickness from 2 mm to 3 mm (±0.02 mm), depending on the application velocity.

Method 2: Measurement of Density

Liquid density of the mixture was measured according to DIN EN 542:2003-08 at 23° C. in a 50 ml metal pycnometer.

Density of solids, such as foams, were measured using Archimedes principle. The volume of the sample was measured by placing the sample in a body of water and reading the volume of water that was displaced by the sample. The weight of the sample was measured, and the density was then calculated by dividing the displaced volume by the weight of the sample.

Method 3: Measurement of Viscosity

Viscosity was measured based on DIN EN 52456 with a Brookfield viscometer at 23° C. under two different measurement conditions. The specific conditions that were used are indicated at the individual measurement results.

The measurement was either performed with a spindle RV-7 at 10 rpm and 23° C. in a Brookfield RVDV-II viscometer (i.e., a Brookfield RV viscometer from AMETEK Brookfield), or with a T-bar spindle T-C at 0.5 rpm and 23° C. in a Brookfield HBDV-III Ultra viscometer ((i.e., a Brookfield HB viscometer from AMETEK Brookfield). By T-bar spindle measurement, the thixotropic properties are taken into account.

When a T-bar spindle was used, this was used together with a Helipath™ stand (AMETEK Brookfield) to create a helical path through the material. The measurement started as soon as the T-bar spindle touched the surface of the material to be measured. The viscosity value after one minute was taken as the viscosity under the T-bar spindle measurement conditions.

Method 4: Measurement of Not Life

Pot life was measured at 23° C. Component A and B, in the desired mixing ratio, were filled into a 200 ml cup having a conical form, a top diameter of 70 mm and a bottom diameter of 45 mm. The components were thoroughly mixed for 1 minute by stirring with a wooden stick which was 300 mm long and 8 mm thick. The pot life was measured starting with the start of the mixing. As soon as the mixture was considerably harder to stir, the pot life was considered to be reached.

Method 5: Measurement of Loss Factor (Oberst Measurement Method)

The loss factor was measured according to procedure A of DIN EN ISO 6721-3 using a BSS 202 clamping device provided by TWS Michael Schulthes (of Lägerdorf, Germany). In this procedure, the loss factor of a LASD layer adhered to a metal strip clamped on one side is determined by the evaluation of electromagnetically excited bending oscillations.

The settings were as follows:
Oberst bars: 240 mm×10 mm×1 mm (spring steel; tensile strength 1000-1300 N/mm$^2$)
coating: 206 mm×10 mm×3 mm
frequency range between approx. 10 and 1000 Hz
order to be measured: 2nd order The Oberst bars in the above-named geometry were measured with a LASD layer having a length of 206 mm and a breadth of 10 mm. Several thicknesses between 1 and 10 mm were measured; they are indicated individually for each sample for which a loss factor is reported herein and in the legends to the Figures. A typical thickness to be measured where no specific thickness is required would be a thickness from 1 to 5 mm, in particular of 3 mm.

The results were as follows:
High density LASD of Example 1 with an NCO/OH ratio of 1.0, a thickness of 3 mm, and of Example 2; a thickness 3.1 mm, the loss factor according to $2^{nd}$ order (100-150 Hz) at 25° C. was greater than 0.1 Low density LASD of Example 3; with a thickness 3 mm, the loss factor according to $2^{nd}$ order (100-150 Hz) at 15° C. was greater than 0.1

The low density LASD was measured at 15° C. because it was intended for automotive application, and 15° C. is the annual average temperature for a vehicle. The high density LASDs were measured at 25° C. because they were intended for household appliances which generally work at higher temperatures (e.g., the average temperature of a wash program for a dishwasher may be 40° C.).

The invention claimed is:

1. A method for producing a coating on a surface of a substrate, the method comprising:
   a. mixing a Component A and a Component B to form a mixture, wherein Component A comprises a polyol and Component B comprises an isocyanate, wherein a ratio of isocyanate groups to polyol hydroxyl groups in the mixture is from 0.55 to 1.0, and wherein either Component A or Component B or both components comprise a filler;
   b. applying the mixture as a liquid through a flat stream extruder to a surface of a substrate to form a coating; and
   c. allowing the coating to cure,
   wherein steps b) and c) are performed at an ambient temperature from 10° C. to 40° C., and the viscosity of the mixture immediately after step b) is from 10 Pas to 500 Pas at 23° C. when measured with a Brookfield RV viscometer at 10 rpm using an RV-7 spindle.

2. The method of claim 1, wherein the density of the mixture of Components A and B is from 0.7 to three g/cm3 at 23° C.

3. The method of claim 1, wherein the ratio of the isocyanate groups to the polyol hydroxyl groups in the mixture is from 0.6 to 1.0.

4. The method of claim 1, wherein Component A has a viscosity from 20 to 1000 Pas at 23° C. and Component B has a viscosity from 0.01 to 10 Pas at 23° C. when measured with a Brookfield RV viscometer.

5. The method of claim 1, wherein the coating is applied by extrusion to form at least one from the group of a film and a bead, or wherein the coating is applied by a dispenser onto a surface which is vertical, slanted, curved, or overhead in relation to the dispenser.

6. The method of claim 1, wherein the coating is a sound deadening coating and wherein the maximum loss factor at $2^{nd}$ order (100-150 Hz) is 0.1 or greater when measured at a temperature from 0° C. to 60° C. according to DIN EN ISO 6721:1996 procedure A with a coating thickness of three mm.

7. A method for producing a sound deadening coating on a surface of a substrate, the method comprising:
   a. mixing a Component A and a Component B to form a mixture, wherein Component A comprises a polyol and Component B comprises a polymeric isocyanate based on MDI, and wherein either Component A or Component B or both components comprise a filler;
   b. applying the mixture as a liquid through a flat stream extruder to a surface of a substrate to form a coating; and
   c. allowing the coating to cure to produce a sound deadening coating,
   wherein steps b) and c) are performed at an ambient temperature of from 10° C. to 40° C., and wherein the maximum loss factor at 2nd order (100-150 Hz) of the sound deadening coating is 0.1 or greater when measured at a temperature from 0° C. to 60° C. according to DIN EN ISO 6721:1996 procedure A for a sound deadening coating thickness of three mm.

8. The method of claim 7, wherein the density of the mixture of Components A and B is higher than 1.7 g/cm3, and wherein the maximum loss factor at 2nd order (100-150 Hz) of the sound deadening coating is 0.1 or greater when measured at 25° C. according to DIN EN ISO 6721:1996 procedure A with a sound deadening coating thickness of three mm.

9. The method of claim 7, wherein the density of the mixture of Components A and B is from 0.7 to 1.2 g/cm3 at 23° C., and the maximum loss factor of the sound deadening coating is 0.1 or greater when measured at a temperature from 7° C. to 40° C. when measured by the Oberst-measurement as described in procedure A of DIN EN ISO 6721-3:1996 with a sound deadening coating thickness of three mm and second order determination, or wherein the density of the mixture of Components A and B is from 1.8 to 2.2 g/cm3 at 23° C., and the maximum loss factor of the sound deadening coating is 0.1 or greater when measured at a temperature from 17° C. to 45° C. when measured by the Oberst-measurement as described in procedure A of DIN EN ISO 6721-3:1996 with a sound deadening coating thickness of three mm and second order determination.

10. The method of claim 7, wherein Component A or Component B or both components comprises a polyurethane polymerization catalyst.

11. The method of claim 7, wherein Component A comprises polyol, filler and a polyurethane polymerization catalyst, in the amounts of
from 20 vol. % to 60 vol. % the filler,
from greater than zero to 0.5 vol. % the polyurethane polymerization catalyst, and
the balance adding up to 100 vol % being polyol; and
Component B comprises from greater than zero to 100 vol. % an isocyanate, and wherein the vol. % are in relation to the total volume of the component.

12. The method of claim 7, wherein the mixing ratio of Component A to Component B is from 1.1:1 to 8:1 by volume.

13. The method of claim 7, wherein the mixing ratio of Component A to Component B is from 2:1 to 6:1 by volume.

14. The method of claim 7, wherein the mixing ratio of Component A to Component B is from 3:1 to 5.5:1 by volume.

15. The method of claim 7, wherein the mixing ratio of Component A to Component B is from 3:1 to 5:1 by volume.

16. The method of claim 7, wherein a ratio of isocyanate groups to polyol hydroxyl groups in the mixture is from 0.55 to 1.2.

* * * * *